(12) United States Patent
Pothineni

(10) Patent No.: US 11,700,425 B2
(45) Date of Patent: Jul. 11, 2023

(54) SYSTEMS AND METHODS FOR LOCKING REMOTE CONTROL

(71) Applicant: DISH Network L.L.C., Englewood, CO (US)

(72) Inventor: Priyanka Pothineni, Vijayawada (IN)

(73) Assignee: DISH NETWORK L.L.C., Englewood, CO (US)

( * ) Notice: Subject to any disclaimer, the term of this patent is extended or adjusted under 35 U.S.C. 154(b) by 0 days.

(21) Appl. No.: 17/489,647

(22) Filed: Sep. 29, 2021

(65) Prior Publication Data

US 2023/0102412 A1   Mar. 30, 2023

(51) Int. Cl.
*H04N 21/475* (2011.01)
*H04N 21/422* (2011.01)
*H04N 21/45* (2011.01)

(52) U.S. Cl.
CPC ... *H04N 21/4751* (2013.01); *H04N 21/42203* (2013.01); *H04N 21/4532* (2013.01); *H04N 21/4753* (2013.01)

(58) Field of Classification Search
CPC ......... H04N 21/4751; H04N 21/42203; H04N 21/4532; H04N 21/4753; H04N 5/44; H04N 21/4221; H04N 21/4222; H04N 21/42226; H04N 21/42225; H04N 21/42224; H04N 21/42222; H04N 21/42221; H04N 21/42212; H04N 21/42204; G08C 2201/93; G08C 2201/92; G08C 2201/61; G08C 2201/31
See application file for complete search history.

(56) References Cited

U.S. PATENT DOCUMENTS

| | | | |
|---|---|---|---|
| 8,843,953 B1* | 9/2014 | Dang | H04N 21/4542 725/28 |
| 2002/0059588 A1* | 5/2002 | Huber | H04N 7/163 348/E5.103 |
| 2005/0083173 A1* | 4/2005 | Konupek | G08C 23/04 340/5.61 |
| 2011/0133885 A1* | 6/2011 | Dai | H04N 21/42204 340/5.63 |
| 2018/0063716 A1* | 3/2018 | Weigand | H04N 21/485 |

* cited by examiner

*Primary Examiner* — Alazar Tilahun
(74) *Attorney, Agent, or Firm* — Seed IP Law Group, LLP

(57) ABSTRACT

A system for locking a remote-control device blocks a remote-control device from sending signals related to user input until a code to unlock the remote-control device is received. The system for locking a remote-control device receives an indication that the remote-control device should be locked and locks the remote-control device. The system for locking a remote-control device receives user input and determines whether the user input included a predetermined code. Based on a determination that the user input included the predetermined code, the system for locking a remote-control device unlocks the remote-control device.

18 Claims, 7 Drawing Sheets user account locking table

| Account ID | Unlocking Code | Locking Code | Logged In | |
|---|---|---|---|---|
| Joe | 1-5-5-"skip" | 8-6-7-5-3-0-9 | No | } 401 |
| Robbie | 2-9-0-"volume up"-"channel down" | "lock" | Yes | } 402 |
| Verna | "Input"-5-8-0 | "channel down"-7-3-"input" | No | } 403 |
| David | 1-2-3-4 | 5-6-7-8 | No | } 404 |
| ⋮ | ⋮ | ⋮ | ⋮ | |
| 410 | 411 | 412 | 413 | |

*Fig. 4*

SYSTEMS AND METHODS FOR LOCKING REMOTE CONTROL

BRIEF SUMMARY

Parental locks are often use to limit access to functionality, channels, purchases, and other set-top box functions, by children, or other unauthorized users. Typically, a parental lock is implemented by preventing a certain account from accessing functionality while the account is logged in. A parental lock may also be implemented through the use of a password required to access the functionality. However, in the case of a user account being used to enforce the parental lock, a child or unauthorized user is able to bypass the parental lock by accessing the function while a user account with permission to access the function is logged in. Additionally, in the case where a password is required before accessing certain functionality, a child or unauthorized user may still be able to access the remote-control device and exert control over the set-top box through the remote-control device.

The embodiments disclosed herein address the issues above and thus help solve the above technical problems and improve the technology of parental locks and remote-control devices by providing a technical solution that locks a remote-control device such that it can't send signals to a set-top box while locked. Additionally, the embodiments disclosed herein are further able to allow a user to specify codes used to lock or unlock the remote control device based on a user account logged into the set-top box. Furthermore, the embodiments disclosed herein are further able to allow a user to specify whether a remote-control is locked with respect to receiving certain types of user input.

In some embodiments, a system for controlling a remote-control device receives an indication that the remote-control device should be locked, locks the remote-control device, receives user input, determines whether the user input included a predetermined code, and unlocks the remote-control based on a determination that the user input included the predetermined code. In some embodiments, the system for controlling a remote-control device receives user input indicating code used to unlock the remote-control device, transmits an indication of the code to the remote-control device, and transmits a signal indicating that the remote-control device should be locked, such that the remote-control device does not send signals in response to receiving user input until user input matching the indicated code is received. In some embodiments, a remote-control device receives an indication that it should be locked, locks itself, receives user input, determines whether the input included a predetermined code, and in response to a determination that the user input included the predetermined code, unlocks the remote-control device.

BRIEF DESCRIPTION OF THE SEVERAL VIEWS OF THE DRAWINGS

FIG. 4 is a table diagram representing a user account locking table, according to various embodiments described herein.

DETAILED DESCRIPTION

Figure 1:
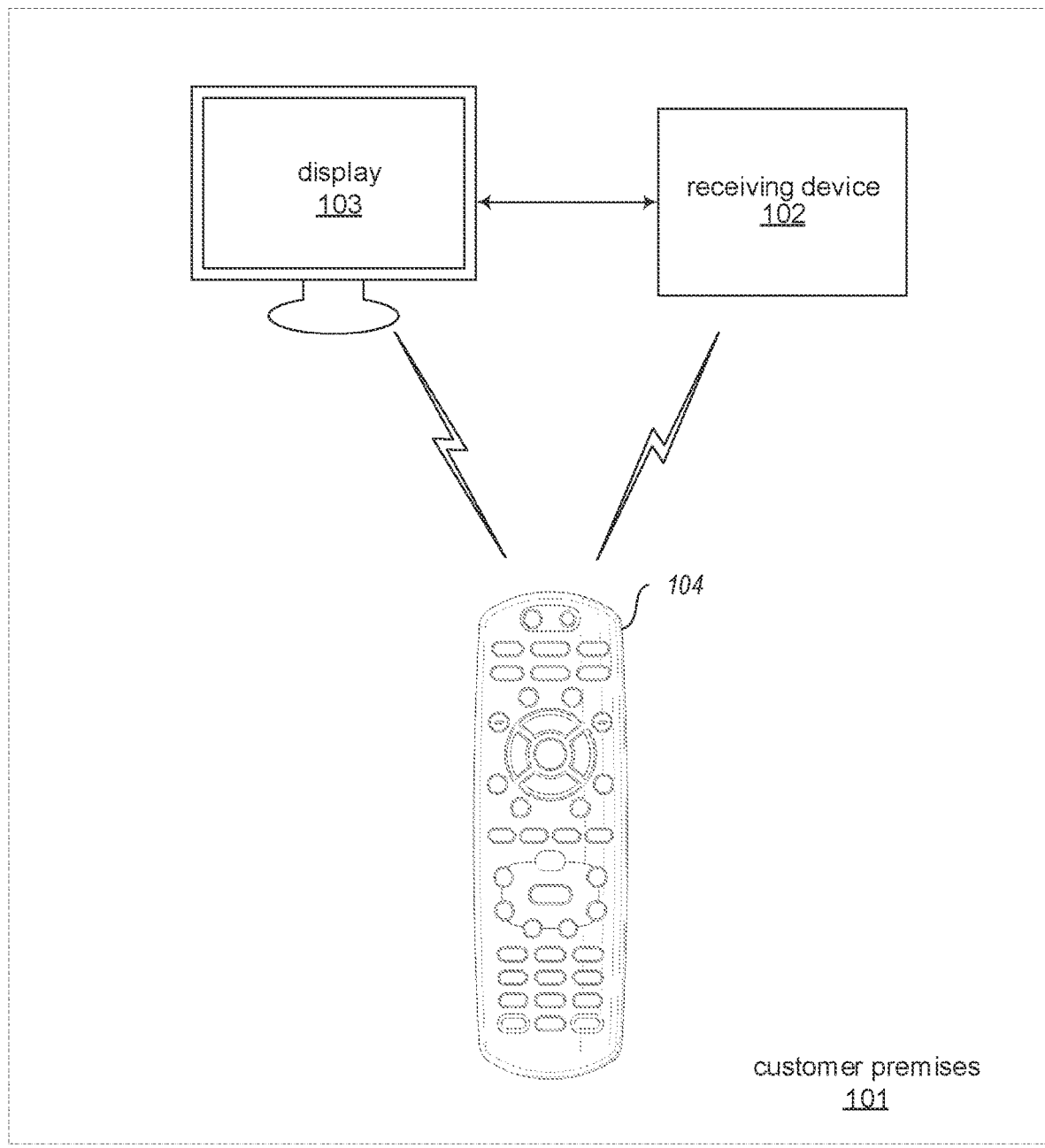
FIG. 1 is a diagram depicting an example environment in which a system to lock a remote-control device is implemented.

Set-top boxes, media receivers, and other media entertainment devices (collectively "set-top boxes") typically include a "Parental-Lock" feature, which allows owners of the set-top box to prevent children or other unauthorized users from making purchases, accessing certain types of media, and accessing other functionality of the set-top box. The parental lock is typically implemented through the use of user accounts with varying levels of permission to use the set-top box, or through a password required to access certain functions of the set-top box.

Currently, it is difficult to prevent users from accessing the features of the set-top box when a user with access to those features is logged in and the unauthorized user gains control of the remote. Furthermore, with the advent of voice-activated remote-controls, the remote-control may inadvertently receive voice input from person other than the current user. Additionally, in the case of a password being used to block certain features, while the parental lock may block features of the set-top box, an unauthorized user may still obtain access to the remote and take other actions, such as changing channels, volume settings, inputs, etc. These, and similar instances when an unauthorized user gains access to the remote-control device, may cause settings on the set-top box or television to be changed, charges to be charged to an account owner when certain actions are taken, and other issues related to the set-top box settings, television settings, or account settings.

The embodiments disclosed herein help solve the above technical problems and improve the technology of parental locks and remote-control devices by providing a technical solution that allows a user to lock the remote-control device itself to prevent it from sending signals to a set-top box. In some embodiments, a computerized system for controlling operation of a remote-control device receives an indication that a remote-control device should be locked. The system then locks the remote-control device until the remote-control device obtains, via user input, a predetermined code which unlocks the remote-control device.

In some embodiments, locking a remote-control device includes preventing the remote-control device from sending any signals to a set-top box. In some embodiments, locking a remote-control device includes preventing the remote-control device from sending signals related to one or more types of user input, such as signals related to voice input, signals related to changing the media displayed, signals related to the volume, signals related to a source of media content, signals mapped to specific buttons, and other signals a remote-control device may transmit to a set-top box. Thus, for example, locking the remote-control device may include preventing the remote-control device from transmitting signals related to voice input, but continue to allow signals from manual input. In some embodiments, locking the remote-control device includes transmitting a signal to a set-top box that the remote-control device is locked instead of the signal that would normally be sent in response to the remote-control device receiving user input. In such embodiments, the set-top box may cause a message to be displayed indicating that the remote-control device is locked.

In some embodiments, preventing the remote-control device from sending signals related to a type of user input includes preventing that type of user input from being obtained by the remote. For example, when a remote-control device is locked from sending signals related to voice input to a set-top box, the remote-control device may de-activate a microphone, or other component used to obtain voice input, until the remote-control device is unlocked. In such embodiments, the remote-control device is additionally able to preserve processing power, memory, and other resources by preventing certain types of input from ever being processed by the remote-control device.

In some embodiments, unlocking the remote-control device is performed by obtaining a predetermined code, or passcode, via user input. The user input may include voice input, a series of button presses on the remote-control device, or any other method of obtaining user input from a remote-control device.

In some embodiments, a remote-control device is locked after the remote-control device receives an indication to lock itself. The indication to lock the remote-control device may be received from user input received at the remote-control device. In some embodiments, user input indicating a predetermined code is used to lock the remote-control device. The indication to lock the remote-control device may be received from a set-top box. The set-top box may transmit the signal to lock the remote-control device in response to user input, a selection of a certain type of media content, after a predetermined period of time, etc.

In some embodiments, a set-top box is used to define a predetermined code used to lock or unlock a remote-control device. The set-top box may obtain user input indicating the code used to lock or unlock the remote-control device. The set-top box may transmit an indication of the code obtained via user input to the remote-control device. The set-top box may transmit an indication of a user profile (or "user account") associated with the code to the remote-control device.

In some embodiments a plurality of user profiles are each associated with at least one of: a code to unlock the remote-control device and a code to lock the remote-control device. The user profiles may be user profiles of the remote-control device. The user profiles may be user profiles of the set-top box. In such embodiments, when user input indicating a code is obtained by a remote-control device, the remote-control device compares the indicated code to a predetermined code associated with a currently active user profile to determine whether to lock or unlock the remote-control device. The remote-control device may receive an indication of a user profile which is currently active from a set-top box.

Unless the context requires otherwise, throughout the specification and claims which follow, the word "comprise" and variations thereof, such as, "comprises" and "comprising" are to be construed in an open, inclusive sense, for example "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

The headings and Abstract of the Disclosure provided herein are for convenience only and do not interpret the scope or meaning of the embodiments.

FIG. 1 is a diagram depicting an example environment in which a system to lock a remote-control device is implemented. It is to be appreciated that FIG. 1 illustrates just one example of a customer premises 101 environment and that the various embodiments discussed herein are not limited to the use of such environment. The customer premises 101 can include a variety of communication systems and can use a variety of communication devices, presentation devices and media including, but not limited to, media provided by satellite, cable, and Internet streaming services.

Audio, video, and/or data service providers, such as, but not limited to, television service providers, provide their customers a multitude of audio/video and/or data programming (hereafter, collectively and/or exclusively "programming"). Such programming is often provided by use of a receiving device 102 communicatively coupled to a display 103 configured to receive the programming.

Receiving device 102 may interconnect to one or more communications media or sources, such as a cable head-end, satellite antenna, telephone company switch, Ethernet portal, off-air antenna, or the like, that provide the programming. The receiving device 102 commonly receives a plurality of programming by way of the communications media or other sources. Based upon selection by the user, the receiving device 102 processes and communicates the selected programming to the one or more displays 103.

The receiving device 102 may include devices such as a "television converter," "receiver," "set-top box," "television receiving device," "television receiver," "television recording device," "digital video recorder (DVR)," "satellite set-top box," "satellite receiver," "cable set-top box," "cable receiver," "media player," "Internet streaming device," "television tuner," "media receiver," and/or "media playback device." Accordingly, the receiving device 102 may be any suitable converter device or electronic equipment that is operable to receive and/or play programming. Further, the receiving device 102 may itself include user interface devices, such as buttons, switches and displays. In many applications, a remote-control device 104 is operable to control the display 103 and communicate with the receiving device 102.

Examples of a display 103 include, but are not limited to, a television ("TV"), a personal computer ("PC"), a monitor, a touch screen, a game system, or the like. A display 103 may employ one or more speakers (not shown) and/or other output devices to communicate video and/or audio content to a user (not shown). In many implementations, one or more displays 103 reside in or near a customer's premises 101 and are communicatively coupled, directly or indirectly, to the receiving device 102. Further, the receiving device 102 and the display 103 may be integrated into a single device. Such a single device may have the functionality of the receiving device 102 described herein and the display 103, or may even have additional functionality.

The receiving device 102 may receive a signal from a communications media or source. The receiving device 102 may be a conversion device that converts, also referred to as formatting, the received signal into a signal suitable for communication to a display 103.

The receiving device 102 may receive programming partially from, or entirely from, another source other than that described above. Other embodiments of the receiving device 102 may receive locally broadcast RF signals, or may be coupled to a communications system via any suitable medium. Non-limiting examples of medium communicatively coupling the receiving device 102 to a communications system include cable, fiber optic, or Internet media.

Customer premises 101 may include other devices which are communicatively coupled to the receiving device 102 and/or a communication system via a suitable media. For example, some customer premises 101 include an optional network, communication system or networked system (not shown), to which receiving device 102 and display 103 can be coupled, collectively referred to as endpoint devices. Non-limiting examples of such a network or communication system include, but are not limited to, an Ethernet system, twisted pair Ethernet system, an intranet, a local area network ("LAN") system, short range wireless network (e.g., Bluetooth®), a personal area network (e.g., a Zigbee network based on the IEEE 802.15.4 specification), a Consumer Electronics Control (CEC) communication system or the like. One or more endpoint devices, such as PCs, data storage devices, TVs, game systems, sound system receivers, Internet connection devices, digital subscriber loop ("DSL") devices, wireless LAN, WiFi, Worldwide Interoperability for Microwave Access ("WiMax") devices, or the like, may be communicatively coupled to the network or to each other so that the plurality of endpoint devices are communicatively coupled together. Thus, such a network allows the interconnected endpoint devices, and the receiving device 102, to communicate with each other. Alternatively, or in addition, some devices in the customer premises 101 may be directly connected to the network, such as a telephone which may employ a hardwire connection or an RF signal for coupling to the network, which may also connect to other networks or communications systems outside customer premises 101.

A hand-held remote-control device 104 may provide an interface between the receiving device 102 and a user. Remote-control device 104 typically communicates with the receiving device 102 using a suitable wireless medium, such as infrared ("IR"), radio frequency ("RF"), or the like and may be any wireless handheld device, including a mobile device such as a cellular telephone or a tablet device. Other input or control devices (not shown) may also be communicatively coupled to the receiving device 102. Non-limiting examples include game device controllers, keyboards, touch pads, touch screens, pointing devices and the like. The remote-control device 104 may also control other devices such as the display 103 and/or other endpoint devices (not shown). The remote-control device 104 may be a "universal" remote or otherwise programmable or configurable by a manufacturer, user, and/or other device to control such other devices.

In some embodiments, the remote-control device 104 may be a multibrand remote that comes to the user preprogrammed with the codes to operate a number of standard home electronic devices. Such a remote may be able to control multiple devices and, in some embodiments, control their main functions, such as channel turning, volume control and other functions. The remote-control device 104 may also be a "learning" remote. In particular, while the remote-control device 104 may be preprogrammed to operate a number of popular electronic models, it may also have the ability to learn the functions of the original manufacturer's remote of each device. For example, this may be accomplished by placing the remote-control device 104 head-to-head with the device's original manufacturer's remote and infrared signals will be transmitted to the learning remote that allow it to duplicate the other remote's commands. Such learning can also be accomplished via RF or wired communication between remote-control devices and/or other devices.

In some embodiments, the remote-control device 104 can receive signals from the receiving device 102. In many such embodiments, the remote-control device 104 can also execute instructions contained in the signals received from the receiving device 102. In some embodiments, the remote-control device 104 can disable its own functionality by refusing to send signals related to one or more functions. In some embodiments, remote-control device 104 can disable its own functionality by disabling one or more buttons related to one or more functions. In some embodiments, the remote-control device 104 may receive an indication that a certain user profile is active, or "logged-in" at the receiving device 102. The remote-control device 104 may receive signals from the receiving device 102 indicating a code used to lock or unlock the remote-control device.

The above description of the customer premises 101, and the various devices therein, is intended as a broad, non-limiting overview of an example environment in which various embodiments of a system to lock a remote-control device is implemented. The customer premises 101 and the various devices therein, may contain other devices, systems and/or media not specifically described herein.

Example embodiments described herein provide applications, tools, data structures and other support to implement systems and methods for locking a remote-control device that may control various media devices. The example embodiments described herein additionally provide applications, tools, data structures and other support to implement systems and methods for locking and unlocking a remote-control device that may control various media devices. Other embodiments of the described techniques may be used for other purposes, including for controlling the operation of remote-control devices generally. In the following description, numerous specific details are set forth in order to provide a thorough understanding of the described techniques. The embodiments described also can be practiced without some of the specific details described herein, or with other specific details, such as changes with respect to the ordering of processes or devices, different processes or devices, and the like. Thus, the scope of the techniques and/or functions described are not limited by the particular order, selection, or decomposition of steps described with reference to any particular module, component, or routine.

Figure 2:
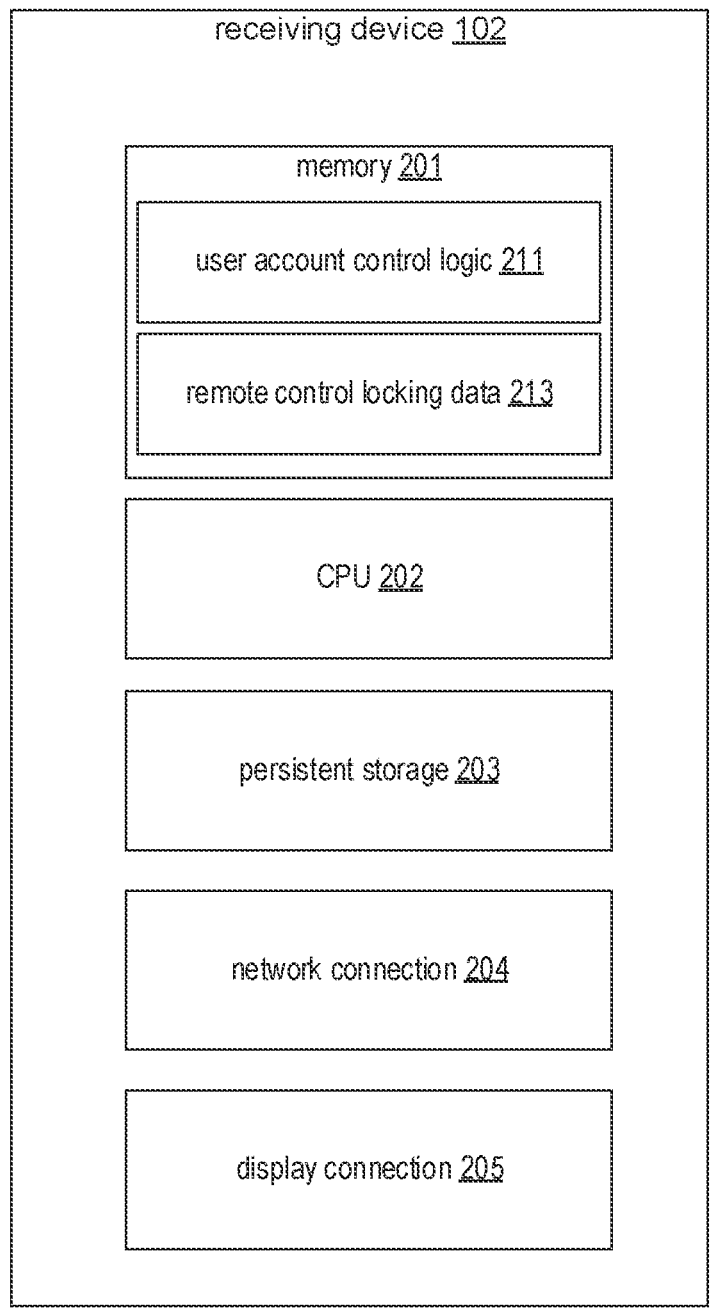
FIG. 2 is a block diagram depicting example components incorporated in a receiving device on which the system to lock remote-control devices operates, according to various embodiments described herein.

FIG. 2 is a block diagram depicting example components incorporated in a receiving device 102 on which the system to lock remote-control devices operates, according to various embodiments described herein. In various embodiments, the receiving device 102 includes one or more of the following: a central processing unit ("CPU") 201 for executing computer programs; a computer memory 202 for storing programs and data while they are being used, including the facility and associated data, an operating system including a kernel, and device drivers; a persistent storage device 203, such as a hard drive or flash drive for persistently storing programs and data; a network connection 204 for connecting the computer system to satellite, cable, and Internet streaming services, remote control devices, such as remote control device 104, and/or other computer systems to send and/or receive data, such as via the Internet or another network and its networking hardware, such as switches, routers, repeaters, electrical cables and optical fibers, light emitters and receivers, radio transmitters and receivers, and the like; and a display connection 205 for causing visual information or data to be displayed, such as on display 103, to a user. While a receiving device 102 configured as described above is typically used to support the operation of the facility, those skilled in the art will appreciate that the facility may be implemented using devices of various types and configurations, and having various components.

The memory 201 may have computer-executable instructions stored thereon, that, when executed by the CPU 202, cause the receiving device 102 and/or remote-control device 104 to perform the operations and functions described herein, such as the user account control logic 211 and the remote control locking data 213. The user account control logic 211 includes data, computer-executable instructions, etc., related to creating and managing user accounts for the receiving device. This data may include codes which can lock or unlock a remote-control device and are associated with a user account. The remote control locking data 213 may include any data, computer-executable instructions, etc., related to locking and unlocking the remote-control device 104, such as which functions are locked, codes to lock and unlock the remote-control device, and any other data related to locking and unlocking the remote-control device 104.

Figure 3:
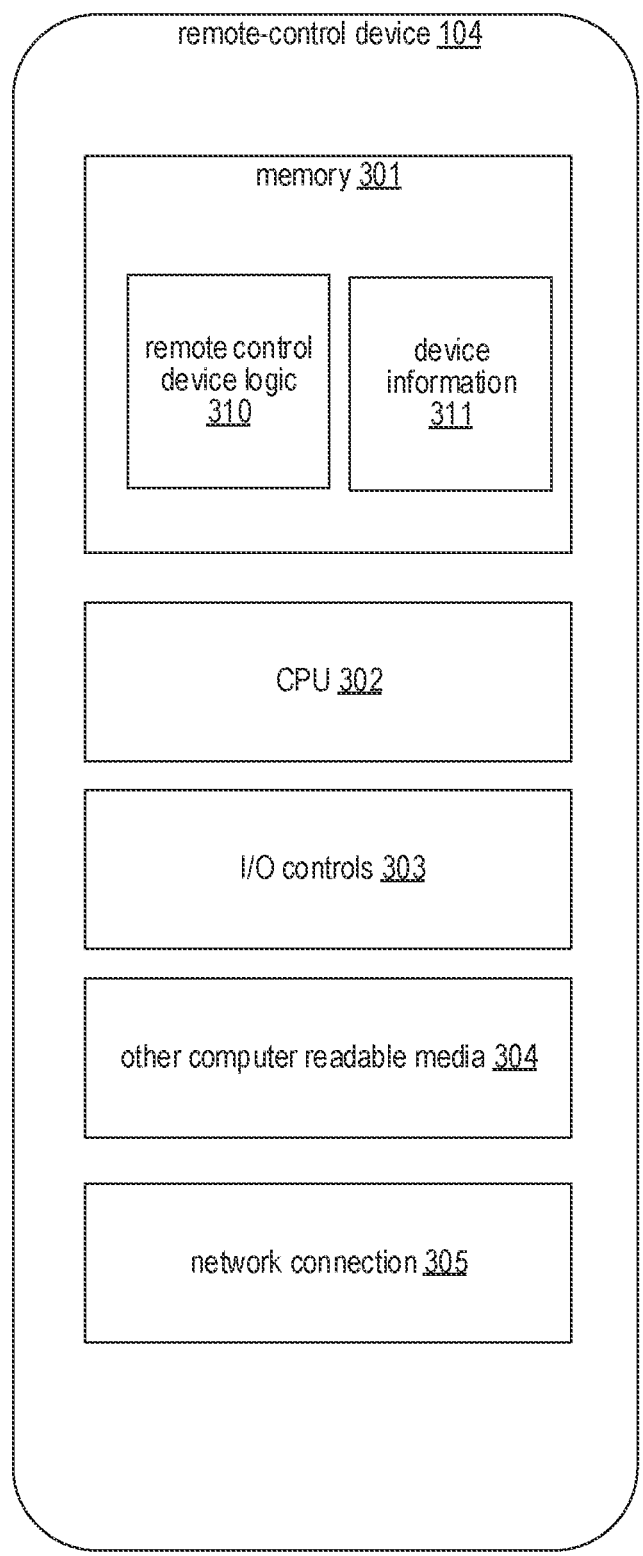
FIG. 3 is a block diagram depicting components of a sample embodiment of a remote-control device for the system to lock remote-control devices.

FIG. 3 is a block diagram depicting components of a sample embodiment of a remote-control device 104 for the system to lock remote-control devices. In one embodiment, remote-control device 104 comprises a computer memory ("memory") 301 and one or more Central Processing Units ("CPU") 302. Also included are Input/Output "I/O" controls 303, including, but not limited to: buttons, virtual buttons, switches, keypads, keyboards, touchpads, touchscreens, display screens, liquid crystal displays, speakers, scroll wheel inputs, optical sensors, gesture sensors, accelerometers, motion control sensors, voice command sensors, microphones, track ball's and/or joysticks, etc. The remote-control device 104 may also include other computer-readable media 304 (e.g., flash memory, SIM card) and a network connection 305. For example, the I/O controls 303 may include buttons, although different numbers and configurations of controls exist in various embodiments, including those with touch screen buttons and other input controls. The network connection 305 includes one or more communication interfaces to various media devices, including but not limited to, radio frequency transceivers, infrared transceivers, wireless Ethernet ("Wi-Fi") interfaces, short range wireless (e.g., Bluetooth®) interfaces and the like. The one or more Central Processing Units ("CPU") 302 may be communicatively coupled to the memory 301, the Input/Output controls 303, other computer-readable media 304 and network connection 305, (e.g., via a communications bus) in a manner to control one or more operations of those various components.

The remote-control device 104 may communicate with receiving device 102, display 103, and possibly other media devices, such as via the network connection 305. Example media devices include other remote-control devices, media players, streaming media devices, DVRs, DVD players, video recorders, audio systems, displays, personal computers, set-top boxes, mobile devices and the like.

Remote-control device logic 310 and device information 311 is shown residing in memory 301. In other embodiments, some portion of the device information and some of, or all of, the components of the logic 310 may be stored on the other computer-readable media 304. The logic 310 may include computer-executable instructions stored on the memory that preferably execute on one or more CPUs 302 and manages operation of the remote-control device 104, including causing the remote-control device 104 to perform the operations and functions described herein. The logic 310 may comprise or implement a system control module as executed by one or more CPUs 302 that are communicatively coupled to the I/O controls 303 and other components of the remote-control device 104. Other code or programs and potentially other data/information (not shown), may also reside in the memory 301, and may execute on one or more CPUs 302. Of note, one or more of the components in FIG. 3 may not be present in any specific implementation. For example, some embodiments may not provide other computer readable media 304.

The logic 310 performs the core functions of the remote-control device 104, as discussed herein and also with respect to FIGS. 4 through 7. In particular, the logic 310 reads input that results from activation of I/O controls 303 on the remote-control device 104 by the user and performs the function corresponding to the input, including sending commands to various devices and performing internal operations of the remote-control device 104.

The remote-control device 104 may receive signals at the network connection 305 representing commands to perform operations in the remote-control device 104. These commands can include additional logic regarding the actions taken by remote-control device 104 after activation of certain I/O controls 303, such as preventing the function corresponding to the input from being performed, locking the remote-control device, unlocking the remote-control device, etc. In some embodiments, the commands can include additional instructions, such as receiving an indication of a user account which is logged-in to a set-top box and accepting codes to lock or unlock the remote-control device based on which user account is logged-in.

In at least some embodiments, remote and/or programmatic access is provided to at least some of the functionality of the remote-control device 104. For example, the remote-control device 104 may provide to other media devices an application program interface ("API") that provides access to various functions of the remote-control device 104, including access to information stored by the remote-control device 104 such as whether functions of the remote are currently disabled.

In an example embodiment, the logic 310 and/or computer-executable instructions stored on memory 201 of the receiving device 102 are implemented using standard programming techniques. For example, the logic 310 and/or computer-executable instructions stored on memory 201 of the receiving device 102 may be implemented as a "native" executable running on CPU 202 and/or the CPU 302, along with one or more static or dynamic libraries. In other embodiments, the logic 310 and/or computer-executable instructions stored on memory 201 of the receiving device 102 may be implemented as instructions processed by a virtual machine that executes as some other program. In general, a range of programming languages may be employed for implementing such example embodiments, including representative implementations of various programming language paradigms and platforms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, PHP, Python, JavaScript, VBScript, and the like) and declarative (e.g., SQL, Prolog, and the like).

The embodiments described above may also use synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the remote-control device 104.

In addition, programming interfaces to the data stored as part of the device information 311, can be available by standard mechanisms such as through C, C++, C#, and Java APIs; libraries for accessing files, databases, or other data repositories; through scripting languages such as JavaScript and VBScript; or through Web servers, FTP servers, or other types of servers providing access to stored data. The device information 311 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of the remote-control device 104 and/or receiving device 102.

Furthermore, in some embodiments, some or all of the components/portions of the logic 310 and/or functionality provided by the computer-executable instructions stored on memory 201 of the receiving device 102 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Such computer program products may also take other forms in other embodiments. Accordingly, embodiments of this disclosure may be practiced with other computer system configurations.

FIG. 4 is a table diagram representing a user account locking table 400, according to various embodiments described herein. The user account locking table 400 includes an account id column 410, an unlocking code column 411, a locking code column 412, and a logged in column 413. The account id column 410 includes information used to identify a specific user account. The unlocking code column 411 includes information specifying a code, or button combination, used to unlock a remote-control device for a user identified in the account id column 410. The locking code column 412 includes information specifying a code, or button combination, used to lock a remote-control device for a user identified in the account id column 410. The logged in column 413 includes information specifying whether a user is logged-in to their account on the receiving device.

For example, row 401 indicates that when "Joe" is logged-in and the remote-control device receives "8-6-7-5-3-0-9" as user input, the remote-control device will lock itself. Then when the remote-control device receives "1-5-5" followed by pressing the "skip" button, as user input, the remote-control device unlocks itself. Additionally, in the example depicted in the user account locking table, the locking and unlocking codes in rows 401, 403, and 404 would not function to lock or unlock the remote-control device because, as indicated in the logged in column 413, the accounts indicated by those rows are not currently logged-in. Thus, in this example, only the codes indicated in row 402 would be able to lock or unlock the remote-control device, until another account is logged-in.

Figure 5:
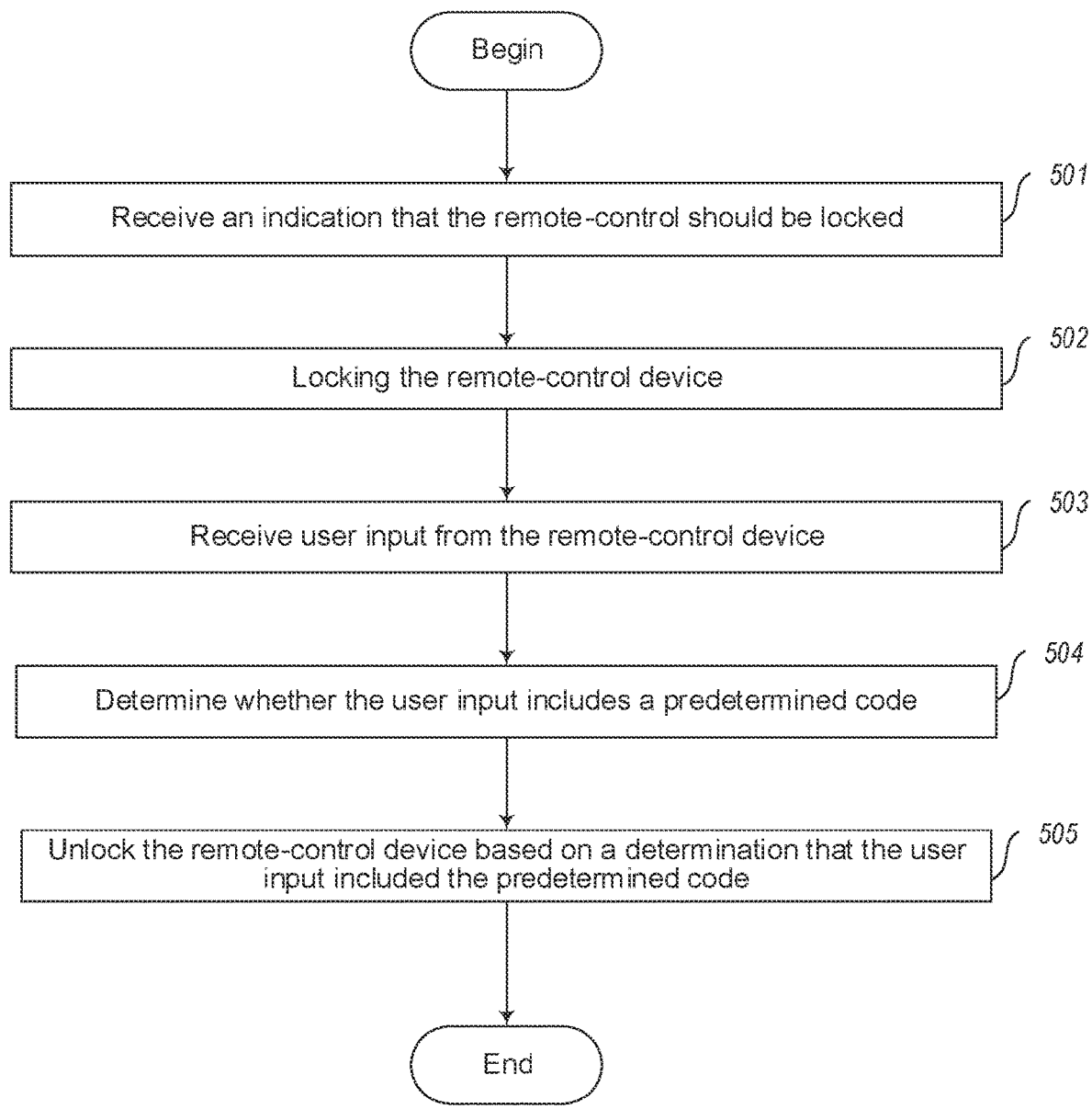
FIG. 5 is a flow diagram depicting a process for locking a remote-control device, according to various embodiments described herein.

FIG. 5 is a flow diagram depicting a process for locking a remote-control device, according to various embodiments described herein. At act 501, the remote-control device receives an indication that it should be locked. At act 502, the remote-control device locks itself, preventing the remote-control device from using at least one type of user input to send a signal to the receiving device.

At act 503, the remote-control device receives user input. At act 504, the remote-control device determines whether the user input includes a predetermined code. At act 505, the remote-control device unlocks itself based on a determination that the user input included the predetermined code.

In some embodiments, the remote-control device is able to receive voice input. The type of user input which is prevented from being sent to the receiving device may be voice input. The user input to unlock the remote-control device may be voice input. In some embodiments, the remote-control device blocks all user input from being sent to the receiving device while the remote-control device is locked. In some embodiments, the remote-control device may send a signal to the receiving device indicating that the remote-control device is locked. The remote-control device may send the signal indicating that the remote-control device is locked when the remote-control device is locked and receives user input.

In some embodiments, the remote-control device receives the indication that it should be locked from a receiving device. The indication that the remote-control device should be locked may be received from user input at the remote-control device.

In some embodiments, the remote-control device receives an indication of the predetermined code used to unlock the remote-control device from the receiving device. In some embodiments, the remote-control device receives an indication of a code used to lock the remote-control device from the receiving device. The remote-control device may periodically receive an updated codes to lock the remote-control device, unlock the remote-control device, or both.

In some embodiments, the predetermined code is associated with a user account. The remote-control device may receive an indication of which user account is logged-in at the receiving device. The predetermined code to unlock the remote-control device may be the predetermined code associated with the user account that is logged-in. The remote-control device may determine which types of input are blocked based on a determination of which user account is logged in. The remote-control device may receive data indicating certain types of input to block from a receiving device. The certain types of input to block may be associated with a user account.

Figure 6:
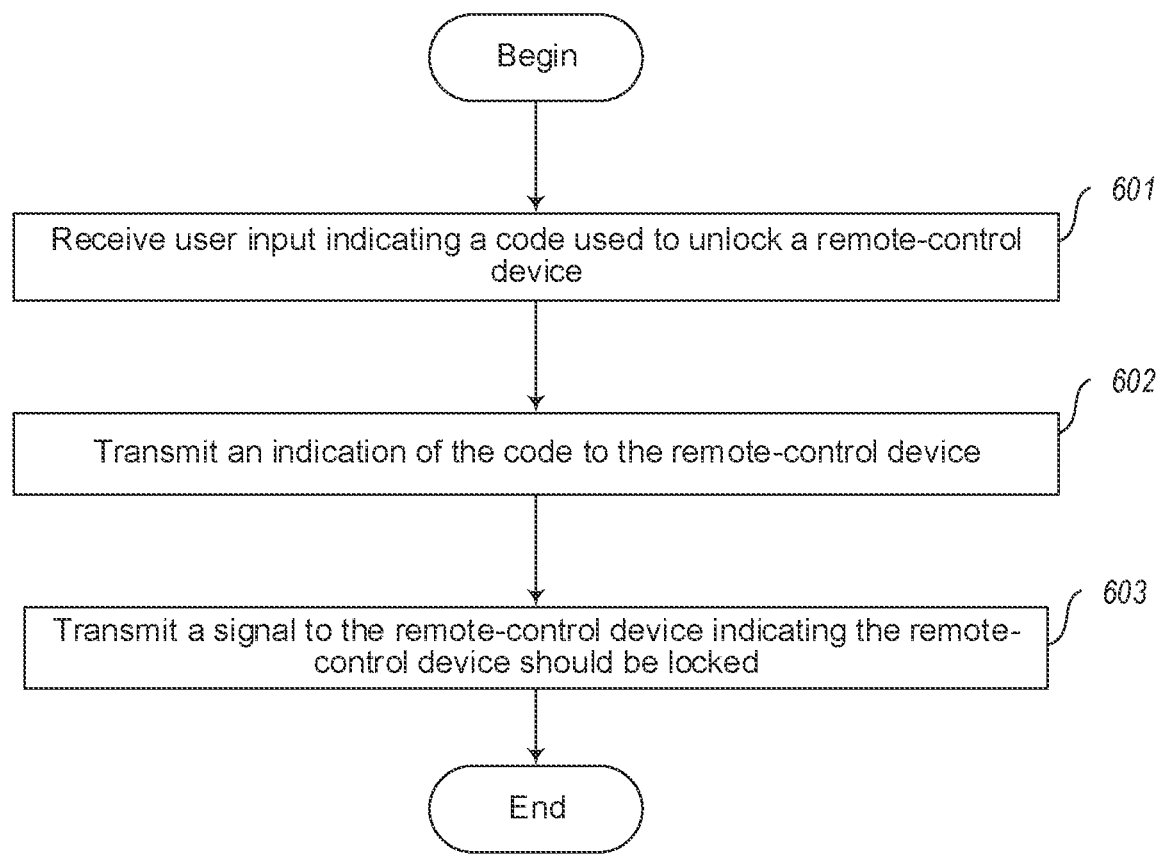
FIG. 6 is a flow diagram depicting a process for operating a receiving device to lock a remote-control device, according to various embodiments described herein.

FIG. 6 is a flow diagram depicting a process for operating a receiving device to lock a remote-control device, according to various embodiments described herein. At act 601, a receiving device receives user input indicating a code used to unlock a remote-control device. At 602, the receiving device transmits an indication of the code to the remote-control device. At 603, the receiving device transmits a signal to the remote-control device indicating that the remote-control should be locked.

In some embodiments, the receiving device receives an indication of a user profile associated with the code used to unlock the remote-control device. The receiving device may transmit an indication to the remote-control device that the code is associated with the user profile. The receiving device may transmit an indication to the remote-control device that the user is currently signed into the user profile, such that the remote-control device determines whether to unlock itself based on a determination that the code associated with the user profile is received via user input. The receiving device may periodically transmit an indication of a new code to unlock the remote-control device.

In some embodiments, the receiving device transmits an indication of a type of input which the remote-control device should prevent sending to the receiving device when the remote-control device is locked. The indication of the type of input which the remote-control device should prevent sending when it is locked may be associated with a user account. For example, the receiving device may transmit an indication to the remote-control device that only voice input should be locked when the user Robbie is logged in. The remote-control device would then only block voice input when the remote-control device is locked and the user Robbie is logged in.

In some embodiments, the receiving device receives an indication that the remote-control device is locked. The receiving device may cause a message to be displayed which indicates that the remote-control device is locked after receiving the indication that the remote-control device is locked.

In some embodiments, a code to lock the remote-control device is associated with a user profile. The receiving device may receive the code to lock the remote-control device via user input. The receiving device may transmit an indication of the code to lock the remote-control device and the user profile it is associated with to the remote-control device. The receiving device may periodically transmit an indication of a new code to lock the remote-control device.

Figure 7:
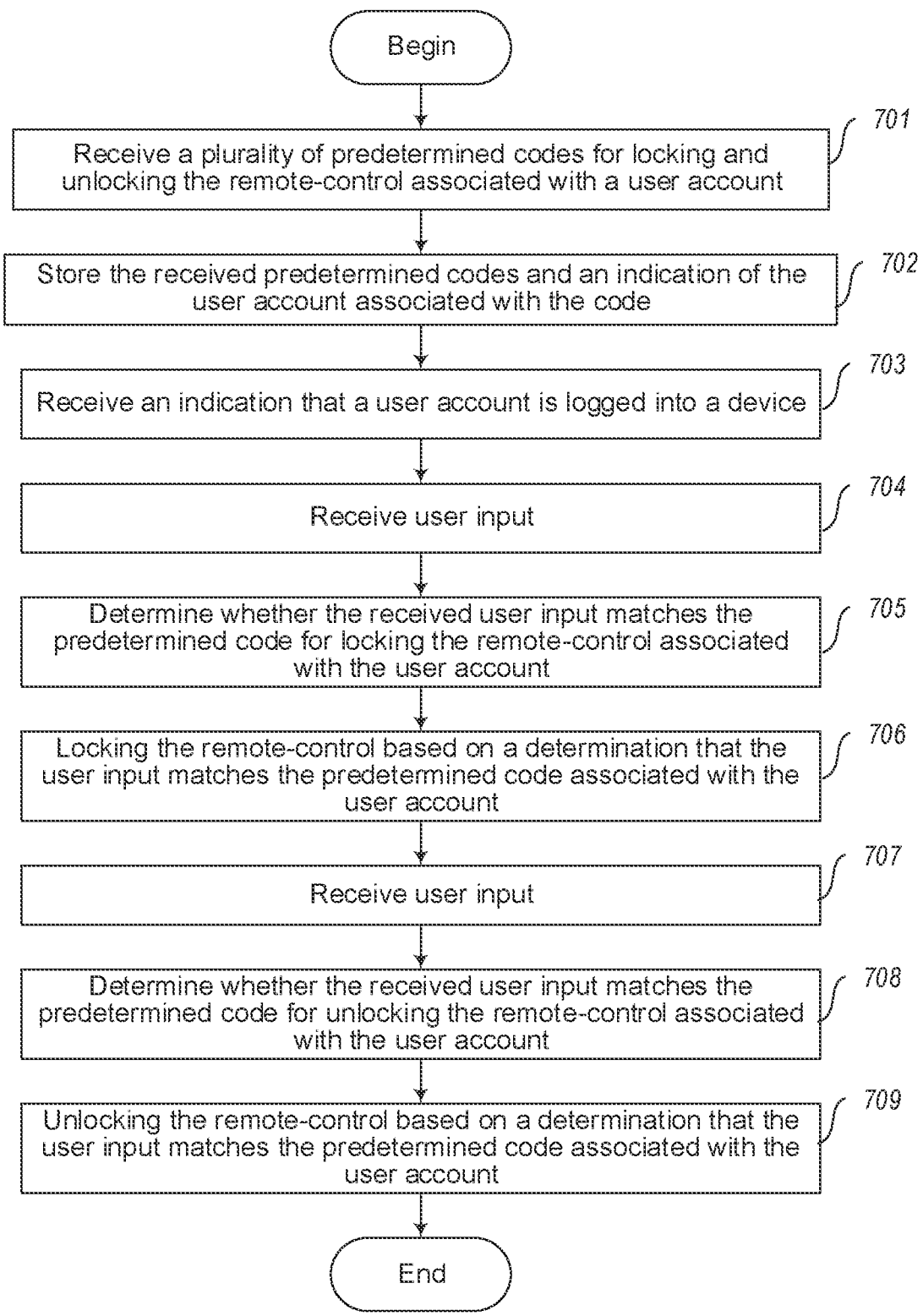
FIG. 7 is a flow diagram depicting a process to lock and unlock a remote-control device based on codes associated with one or more accounts, according to various embodiments described herein.

FIG. 7 is a flow diagram depicting a process to lock and unlock a remote-control device based on codes associated with one or more accounts, according to various embodiments described herein. At act 701, the remote-control device receives a plurality of predetermined codes for locking and unlocking the remote-control device, where each code is associated with a user account. At act 702, the remote-control device stores the received codes along with an indication of the user account associated with the code.

At act 703, the remote-control device receives an indication that a user account is logged-in to a receiving device. At act 704, the remote-control device receives user input. At act 705, the remote-control device determines whether the received user input matches the predetermined code for locking the remote-control device which is associated with the user account that is logged-in. At act 706, the remote-control device locks itself based on a determination that the user input matches the predetermined code associated with the user account.

At act 707, the remote-control device receives additional user input. At act 708, the remote-control device determines whether the additional user input matches a predetermined code for unlocking the remote-control device which is associated with the user account that is logged-in. At act 709, the remote-control device unlocks itself based on a determination that the user input matches the predetermined code to unlock the remote-control device that is associated with the user account that is logged-in.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for controlling operation of a remote-control device, comprising:
   at least one computer processor; and
   at least one memory coupled to the at least one computer processor, the at least one memory having computer-executable instructions stored thereon that, when executed by the at least one computer processor, cause the at least one computer processor to:
      receive, at the remote-control device, an indication that the remote-control device should be locked;
      identify a user profile of a plurality of user profiles based on the indication that the remote-control device should be locked;
      in response to the identification:
         lock the remote-control device, such that the remote-control device is prevented from transmitting signals in response to receiving user input;

select a predetermined code based on the identified user profile; and receive, by the remote-control device, the predetermined code;

receive, at the remote-control device, user input;

in response to the receiving, determine, by the remote-control device, whether the user input included the predetermined code; and in response to determining that the user input included the predetermined code, unlocking the remote-control device, such that the remote-control device is able to transmit signals in response to receiving user input.

2. The system of claim 1, wherein the user input further comprises voice input.

3. The system of claim 2, wherein preventing the remote-control device from transmitting signals further comprises:

detecting whether user input received by the remote-control device is voice input; and preventing the remote-control device from processing the voice input when the remote-control device is locked.

4. The system of claim 2, wherein preventing the remote-control device from transmitting signals in response to receiving user input further comprises:

detecting whether user input received by the remote-control device is voice input; and preventing the remote-control device from transmitting signals in response to receiving the user input only if the user input is voice input.

5. The system of claim 1, wherein the predetermined code is a code defined by a user on a device other than the remote-control device.

6. The system of claim 1, wherein the computer-executable instructions further cause the processor to:

receive user input, via the remote-control device, indicating a the user would like to define the predetermined code;

in response to the receiving, receive user input, via the remote-control device, defining the predetermined code; and in response to the receiving, define the predetermined code based on the received user input defining the predetermined code.

7. The system of claim 1, wherein the indication that the remote-control device should be locked is received in response to user input received from the remote-control device.

8. A system for controlling operation of a remote-control device, comprising:

at least one computer processor; and at least one memory coupled to the at least one computer processor, the at least one memory having computer-executable instructions stored thereon that, when executed by the at least one computer processor, cause the at least one computer processor to:

receive user input indicating a code used to unlock the remote-control device;

associate a user profile of a plurality of user profiles with the code used to unlock the remote-control device;

receive second user input indicating that the remote-control device is to be locked;

select a user profile of the plurality of user profiles based on the second user input;

identify an unlocking code based on the selected user profile;

transmit an indication of the unlocking code to the remote-control device; and transmit a signal to the remote-control device, the signal indicating to the remote-control device that a user associated with the user profile has requested that the remote-control device be locked, such that the remote-control device is prevented from sending signals in response to receiving user input until the remote-control device receives input indicating the unlocking code.

9. The system of claim 8, the computer-executable instructions further causing the processor to:

receive user input indicating the user profile of a plurality of user profiles;

transmit an indication to the remote-control device that the code is associated with the user profile; and transmit an indication to the remote-control device that a user is signed into the user profile, such that, the remote-control device is unlocked by using a code associated with the user profile which is currently signed in.

10. The system of claim 8, wherein the remote-control device is prevented from sending signals in response to receiving user input in the form of voice input.

11. The system of claim 8, wherein the remote-control device is only prevented from sending signals in response to receiving user input in the form of voice input.

12. A method for controlling operation of a remote-control device, comprising:

receiving, at the remote-control device, an indication that the remote-control device should be locked;

determining a user profile of a plurality of user profiles based on the indication that the remote-control device should be locked;

in response to the determining:

preventing the remote-control device from transmitting signals in response to receiving user input by locking the remote-control device;

selecting a predetermined code based on the determined user profile; and receiving, by the remote-control device, the predetermined code;

receiving, at the remote-control device, user input;

in response to the receiving, determining, by the remote-control device, whether the user input included the predetermined code; and in response to determining that the user input included the predetermined code, unlocking the remote-control device, such that the remote-control device is able to transmit signals in response to receiving user input.

13. The method of claim 12, wherein the user input further comprises voice input.

14. The method of claim 13, wherein preventing the remote-control device from transmitting signals further comprises:

detecting whether user input received by the remote-control device is voice input; and preventing the remote-control device from processing the voice input when the remote-control device is locked.

15. The method of claim 12, further comprising:

receiving a plurality of predetermined codes, each predetermined code being associated with one user profile of the plurality of user profiles;

receiving an indication of a user profile which a user is signed into; and unlocking the remote-control device based on a determination that the user input indicates a code which matches the predetermined code associated with the user profile which the user is signed into.

16. The method of claim 12, wherein the predetermined code is a code defined by a user on a device other than the remote-control device.

17. The method of claim 12, further comprising:
receiving user input, via the remote-control device, indicating that a user would like to define the predetermined code;
in response to the receiving, receiving user input, via the remote-control device, defining the predetermined code; and
in response to the receiving, defining the predetermined code based on the received user input defining the predetermined code.

18. The method of claim 12, wherein the indication that the remote-control device should be locked is received in response to user input received from the remote-control device.

\* \* \* \* \*